(12) United States Patent  
Schwarz

(10) Patent No.: US 6,484,755 B1
(45) Date of Patent: Nov. 26, 2002

(54) BLEND DOOR ACTUATION FOR DUAL ZONE

(75) Inventor: Stefan Schwarz, Rochester Hills, MI (US)

(73) Assignee: Valeo Climate Control Inc., Auburn Hills, MI (US)

( * ) Notice: Subject to any disclaimer, the term of this patent is extended or adjusted under 35 U.S.C. 154(b) by 0 days.

(21) Appl. No.: 09/282,488

(22) Filed: Mar. 31, 1999

(51) Int. Cl.[7] .............................. B60H 3/00; F24F 1/00; F25B 29/00
(52) U.S. Cl. ...................... 137/637.3; 165/203; 165/42; 165/43; 165/103; 454/156; 454/160; 454/161; 454/335; 454/336; 237/12.3 A; 237/12.3 B
(58) Field of Search .......................... 165/42, 43, 103, 165/101, 203; 454/160, 162, 161, 156, 335, 336; 237/12.3 A, 12.3 B; 137/637.3

(56) References Cited

U.S. PATENT DOCUMENTS

| | | | | |
|---|---|---|---|---|
| 3,267,962 A | * | 8/1966 | Josephson et al. | 454/336 |
| 4,420,115 A | * | 12/1983 | Matsushima et al. | 237/12.3 A |
| 4,549,692 A | * | 10/1985 | Busch et al. | 237/12.3 A |
| 4,852,638 A | * | 8/1989 | Hildebrand et al. | 165/42 |
| 5,101,883 A | * | 4/1992 | Kinmartin et al. | 165/43 |
| 5,647,399 A | | 7/1997 | Andersen | |
| 5,862,677 A | * | 1/1999 | Kim et al. | 165/42 |
| 6,019,288 A | * | 2/2000 | Arold et al. | 165/43 |

FOREIGN PATENT DOCUMENTS

| | | | | |
|---|---|---|---|---|
| CH | 168658 | * | 9/1934 | 165/103 |
| DE | 2310934 | * | 9/1974 | 454/156 |
| DE | 2757651 | * | 6/1979 | 454/160 |
| EP | 0 267 101 A1 | | 5/1988 | |
| FR | 2700502 | * | 7/1994 | 165/43 |
| FR | 2 757 594 A1 | | 6/1998 | |
| JP | 0043017 | * | 4/1981 | 165/103 |
| JP | 0122213 | * | 7/1983 | 165/43 |
| JP | 0193918 | * | 8/1986 | 165/43 |
| JP | 0094018 | * | 4/1989 | 62/239 |
| JP | 5-203255 | * | 8/1993 | 454/162 |

OTHER PUBLICATIONS

English language Abstract for FR 2 757 594 A1, Jun. 26, 1998.
English language Abstract for EP 0 267 101 A1, Nov. 5, 1988.

* cited by examiner

Primary Examiner—John K. Ford
(74) Attorney, Agent, or Firm—Morgan & Finnegan, L.L.P.

(57) ABSTRACT

A vehicle air conditioning apparatus having two pair of rotatable flow control doors for separately controlling and varying the temperature and flow of air supplied to two different zones of the vehicle interior. Each pair of flow control doors are linked together and operated by a single actuator device. One of each pair of flow control doors is rotatable about a common axis

2 Claims, 1 Drawing Sheet

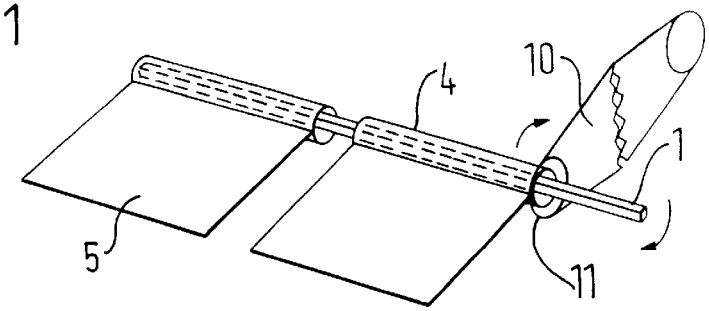
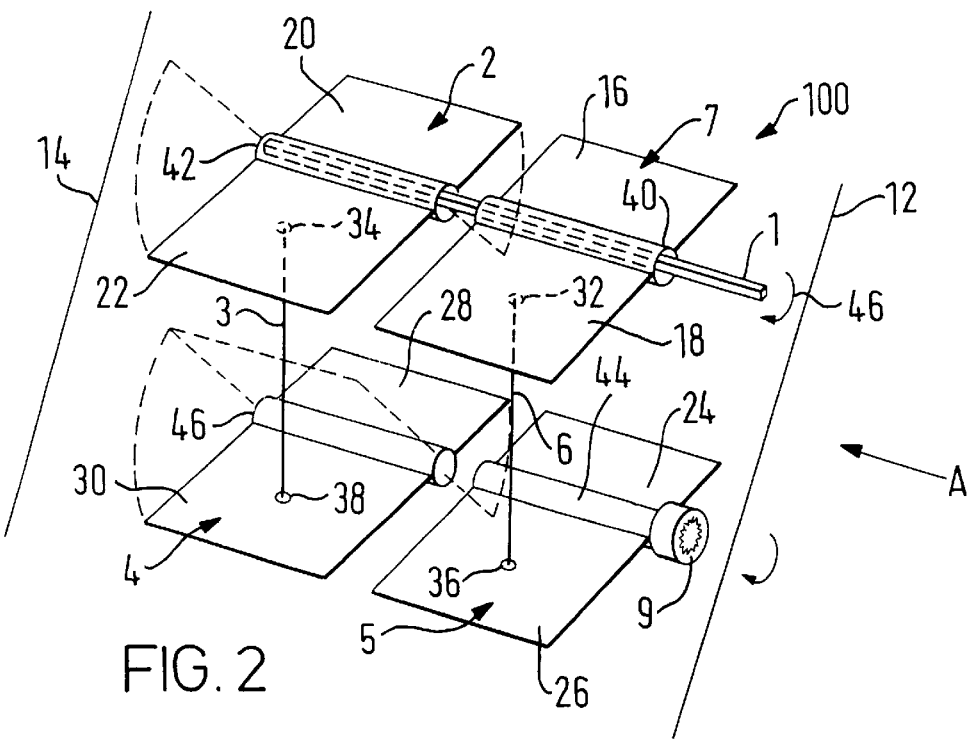
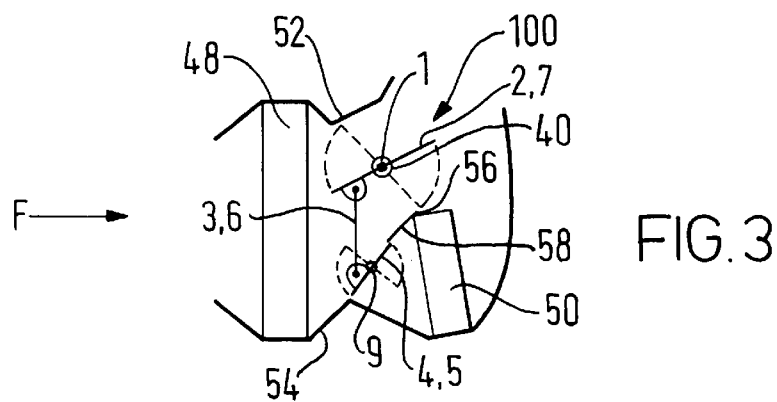

BLEND DOOR ACTUATION FOR DUAL ZONE

FIELD OF THE INVENTION

The present invention relates to vehicle air-conditioning systems and in particular to flow control devices.

BACKGROUND OF THE INVENTION

It is known in the art to provide an air-conditioning system for a vehicle which makes use of blend doors to provide a supply of air of variable temperature to an outlet into the interior of the vehicle. There is usually provided an evaporator for cooling and a heater for heating the air. It is common to situate the evaporator and the heater in the same duct, such that air passes through the evaporator first, after which some or all of it can be heated by passing through the heater.

Furthermore it is known to provide a dual-zone system, whereby two different areas of the vehicle interior can each be supplied with their own supply of variable temperature air. For example, the driver side of the vehicle and the passenger side can each be provided with their own air outlets, the temperature of the air on the driver side being varied by the driver and the temperature of the air on the passenger side being varied by the passenger.

In currently known systems, blend doors are provided inside the air-conditioning ducts, the position of which can be varied to allow different proportions of cooled and warmed air to pass into the vehicle. Such systems suffer from several problems. In general, a separate actuator is required for each blend door, which can be costly and can cause problems with space and access for installation and repair. In order for two blend doors controlling cooled and warmed air for one zone of a vehicle to be controllable by a single dial on the vehicle dashboard, due to the locations of the doors for reasons of space and efficiency, it is often necessary to introduce a gearing system to allow each door to be operated independently. The disadvantages of such a system are that the use of gears introduces additional tolerances into the system whilst at the same time reducing design freedom since both actuation pivots need to be close together.

It would be desirable to provide an arrangement of doors which mitigated some of these problems.

SUMMARY OF THE INVENTION

According to the present invention there is provided a flow controller for an air-conditioning system of a vehicle, the flow controller comprising:

a first flow control door, a second flow control door and a first driveshaft running through the first door and coupled to the second door, such that the first door can rotate about the first driveshaft independently thereof and the second door is rotatable by the first driveshaft about the longitudinal axis of the driveshaft;

a third flow control door and a fourth flow control door, wherein each of said doors is rotatable;

a first drive device for said second door and a second drive device for said third door, wherein said first and second drive devices are disposed on a same side of said flow controller;

a first member connecting the second door to the fourth door, such that when the second door rotates, the first member causes the fourth door to rotate;

a second member connecting the first door to the third door, such that when the third door rotates, the second member causes the first door to rotate.

Preferably the third and fourth doors share a common axis.

According to a second aspect of the invention there is provided an air flow control device comprising a first and a second duct, each duct having a respective mouth, and a first and a second door, each door disposed across a respective duct mouth and being pivotable to enable or prevent flow through the associated duct, wherein a member extends from the first door to the second door such that when the first door closes the first duct, the second door opens the second duct and when the first door opens the first duct the second door closes the second duct or that when said first door partly opens the first duct, said second door partly opens the second duct.

Suitably the first door opens and closes about a pivot and the second door opens and closes about a pivot.

Preferably the first and second ducts extend from a common air passage and the common air passage contains an evaporator and the first duct contains a heater core.

DESCRIPTION OF A PREFERRED EMBODIMENT

FIG. 1 shows a perspective view of a blend door operating arrangement for an air-conditioning system, in accordance with the prior art.

FIG. 2 shows a perspective view of a flow control system according to preferred embodiment of the present invention.

FIG. 3 shows a cut-away side view of the arrangement of FIG. 2 situated in an air-conditioning duct.

DESCRIPTION OF THE PREFERRED EMBODIMENTS

In the figures, like reference numerals indicate like parts.

FIG. 1 shows a view of a door operating arrangement according to the prior art for controlling air flow to a vehicle. It comprises a driveshaft 1 which passes through a hollow channel running along one side of a first door 4 and then passes fixedly along a second door 5. The first door 4 would be disposed within an air-conditioning duct to vary the amount of cooled air which entered the vehicle interior and the second door 5 would be disposed to vary the amount of warm air which entered the vehicle. In order for both doors to be moved as required, a gear system 10 is used. This is because a single dashboard control is provided as a first actuator for turning shaft 1, which rotates door 5, but the gearing system 3 is required to act as a second actuator to allow independent rotation of door 4 by means of ring 11. Therefore, two actuators are required for each zone.

A preferred embodiment of the present invention is shown. in FIG. 2. An air duct is indicated as having a first side 12 and a second side 14, which in the view shown are a right hand side 12 and a left hand side 14. There is provided a driveshaft 1 which extends leftwards from right hand side 12 and passes through a hollow cylindrical channel 40 which forms a central axis in a first flow control door 7, and then passes fixedly along a central axis 42 of a second flow control door 2. Thus the first flow control door 7 can be considered to be divided by the hollow channel 40 into a first region 16 and a second region 18. Similarly, the second flow control door 2 can be considered to be divided into a first region 20 and a second region 22.

There are provided two further flow control doors, namely a third flow control door 5 which can be considered to be divided by a central axis 44 into a first region 24 and a second region 26, and a fourth flow control door 4, which can be considered to be divided by a central axis 46 into a first region 28 and a second region 30. The third door 5 is situated such that it is approximately directly below door 7 (as viewed in FIG. 2), such that its central axis 44 is parallel with the hollow channel 40 of the first door 7. Attached on a pivot 32 in approximately the centre of the second region 18 of the first door 7 is a first straight, rigid link 6, which is also attached to approximately the centre of the second region 26 of the third door 5 on a pivot 36. The fourth door 4 is situated approximately directly below the second door 2, such that its central axis 46 is parallel with the central axis 42 of the second door 2 as well as being in line with central axis 44 of third door 5. There is a second rigid link 3, which is attached on a pivot 34 in approximately the centre of the second region 22 of the second door 2 and which is also attached on a pivot 38 in approximately the centre of the second region 30 of the fourth door 4. Defining the width of the four doors in a direction perpendicular to their central axes, doors 4 and 5 are smaller in width than doors 2 and 7.

The third door 5 is rotationally actuated at its right hand side 9 on the central axis 44. The driveshaft 1 is similarly rotationally actuated-at its right hand side 46. Either rotation could be provided by levers or any other direct turning mechanism. The arrangement of this embodiment has the advantage over the prior art that both actuators are located on the same side of the duct, which means that only one access route is required for installation and repair. Furthermore, gear systems are avoided since purely a direct drive is possible. The use of the direct drive will be explained further below.

The arrangement of the driveshaft, the four doors, the two links and the two actuators will hereinafter be referred to as the "door arrangement" and it is indicated generally by 100 in FIG. 2.

In operation, when driveshaft 1 is rotated, first door 7 is unaffected because it is able to move independently of driveshaft 1 due to the hollow channel 40. By contrast, driveshaft 1 is fixedly attached to second door 2 and hence drives it in rotation about its central axis 42. As second door 2 rotates, the presence of the fixed link 3 results in fourth door 4 being rotated in the same direction as second door 2 and by the same angular amount. The two doors are maintained at a constant distance apart by the link 3, by virtue of the pivots 34 and 38.

In a similar manner, third door 5 is driven in rotation, link 6 enables first door 7 to move in tandem with door 5.

To understand the full advantages of the invention, it is necessary to consider how the door arrangement 100 of FIG. 2 would function within a vehicle air-conditioning system. It is intended for use in a dual zone system. The purpose of such a system is to provide separate supplies of air-conditioned air to two zones of the vehicle interior. In this embodiment, the two zones are the driver side and the passenger side. Doors 7 and 5 and link 6 can be considered to be for use in the driver side of the system and doors 2 and 4 and link 3 can be considered to be for use in the passenger side of the system.

Turning now to FIG. 3, which is a view of the arrangement of FIG. 2 in the direction of arrow A (with side 12 of the duct not visible), it can be seen how doors 7 and 5 are aligned relative to one another. In this view, doors 2 and 4 and link 3 are situated behind doors 7 and 5 and link 6 and are therefore not visible. For the purposes of this view, the width of the duct is defined in a vertical direction, the duct having an upper wall 52 and a lower wall 54. It will be appreciated that the duct and door arrangement could be disposed at any suitable angle in a vehicle. Also shown are an evaporator 48 and a heater core 50. Air flow is in the direction of arrow F, thus the evaporator 48 is situated upstream of the door arrangement 100 across the entire width of the duct and the heater core 50 is situated downstream of the door arrangement across approximately half the width of the duct. Extending from the corner 56 of the heater core 50 in the centre of the duct approximately at right-angles to the lower wall 54 of the duct in the vicinity of the heater core, is a short wall 58.

In operation, air is drawn into the duct (for example by a fan, which is not shown) so it passes into evaporator 48. Here it is cooled as well as being de-humidified. From the evaporator 48, it flows to the door arrangement 100. The duct is shaped such that, with the doors 5,7 in the position shown, door 5 extends from the end of the wall 58 to the lower wall 54 of the duct, thus preventing air from flowing into the heater core. This is the "closed" position of door 5. Door 7 is positioned virtually parallel with the upper wall 52 of the duct, so it allows all the air from the evaporator 48 to flow past it. This is the "open" position of door 7. Therefore, no heating takes place and all the air from the evaporator continues along the duct, so the air that arrives at an outlet into the driver side of the vehicle is as cool as possible.

Should an operator wish to heat the air, he would operate a device, which would for example be in the form of a dial on the dashboard, which would directly rotate door 5. In this particular embodiment, door 5 would rotate clockwise, thus creating gaps either side of itself, past which air can flow. At the same time as door 5 rotates, by virtue of the link 6, door 7 would also rotate clockwise by the same angular distance, thus allowing less air to flow past it. This means that some of the air would flow past door 7 and the rest of it would flow past door 5 and into the heater core 50 where it would be heated. Therefore a mixture of heated and cooled air would continue along the duct and would mix so that air arriving at the outlet into the driver side of the vehicle would be warmer than when the doors are in the positions shown in FIG. 2.

At a fully open position, door 5 would be situated approximately parallel with lower wall 54 of the duct, so it would allow all the air from evaporator 48 to flow past it. At the fully open position of door 5, door 7 would be at a fully closed position, such that it would extend from the corner 56 of the heater core to the upper wall 52 of the duct. In this position, no air would be able to flow past door 7. Therefore, the air arriving at the outlet into the driver side of the vehicle would be as hot as possible. The rotational paths and these two positions of the doors are shown as dotted lines in FIG. 3. It will now be appreciated that the reason that doors 4 and 5 are narrower than doors 2 and 7 is to allow the rotation without fouling on the heater core 56 or the lower wall 54 of the duct. It can also be seen that as a result of the link 6 being pivoted to maintain a constant distance between doors 5 and 7, and hence allow equal angular rotations, the maximum range of air temperature can be achieved.

Furthermore, it is easy to envisage doors 2 and 4 being situated behind doors 7 and 5 respectively in FIG. 2. There would be a similar device on the dashboard on the passenger side of the vehicle which would allow the passenger to directly rotate driveshaft 1. This would not affect the movement of door 7 on the driver side, since the driveshaft 1 is situated in hollow channel 40 within door 7. However, driveshaft 1 would operate door 2, thus allowing movement between open and closed positions to allow a variable amount of cooled air from the evaporator 48 to continue along the duct and to an outlet on the passenger side of the vehicle. At the same time, as a result of the link 3, the door 4 would rotate, thus allowing a variable amount of air to pass through the heater core 50 from where it would continue along the duct. Therefore, when door 4 is closed door 2 is open and vice versa. The passenger side doors 2,4 and the driver side doors 5,7 are operated completely independently so that the driver and the passenger can each choose the temperature of air which they wish to be outlet on their side. Only one actuator is required for each side of the vehicle, both of these actuators being situated on the side 12 of the duct.

In order to allow the driver and passenger each to choose the temperature of the air they want effectively, it may be necessary to separate the duct into two passages by means of an additional wall. The driver side doors 5,7 would be located in one passage and the passenger side doors 2,4 would be located in the other passage. This would nevertheless allow the invention to work, because an opening in the wall could be provided through which driveshaft 1 could pass.

It will be appreciated by those skilled in the art that many variations of the above embodiment are possible. For example, a hollow passage could be provided in door 5, such that a shaft could be used to drive door 4 instead of door 5. Also, door 4 could be situated other than in line with door 5, for example above door 2 in FIG. 1. The driveshaft 1 need not be straight, but could instead comprise a step so that it would not be necessary for door 2 to be directly in line with door 7. The positions of the linkages could also be varied and the position of the axes of the doors need not be central. It will be appreciated that there are many variations on the described embodiment which could be implemented without departing from the scope of the invention.

What is claimed is:

1. A flow controller for an air-conditioning system of a vehicle, the flow controller comprising:

(a) a first flow control door, a second flow control door and a first driveshaft running through the first door and coupled to the second door, such that the first door can rotate about the first driveshaft independently thereof and the second door is rotatable by the first driveshaft about the longitudinal axis of the driveshaft;

(b) a third flow control door and a fourth flow control door, wherein each of said doors is rotatable;

(c) a first drive device for said second door and a second drive device for said third door, wherein said first and second drive devices are disposed on a same side of said flow controller;

(d) a first member connecting the second door to the fourth door, such that when the second door rotates, the first member causes the fourth door to rotate;

(e) a second member connecting the first door to the third door, such that when the third door rotates, the second member causes the first door to rotate.

2. A flow controller according to claim 1, wherein the third and fourth doors share a common axis.

* * * * *